United States Patent
Sammoury et al.

(10) Patent No.: US 11,736,743 B1
(45) Date of Patent: Aug. 22, 2023

(54) METHODS AND APPARATUS FOR ANALYZING VIDEO QUALITY OF PROGRAMMING BY CONTENT TYPE

(71) Applicant: Charter Communications Operating, LLC, St. Louis, MO (US)

(72) Inventors: Chris Sammoury, Frederick, CO (US); Iris Liu, Lafayette, CO (US); Jason Donovan, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/679,839

(22) Filed: Feb. 24, 2022

(51) Int. Cl.
    *H04N 21/23* (2011.01)
    *H04N 21/234* (2011.01)
    *H04N 21/24* (2011.01)

(52) U.S. Cl.
    CPC ... *H04N 21/23418* (2013.01); *H04N 21/2407* (2013.01)

(58) Field of Classification Search
    CPC .. H04N 21/812; H04N 21/85; H04N 21/8545; H04N 5/74; H04N 5/772; H04N 7/183; H04N 13/20; H04N 13/271; H04N 19/00
    See application file for complete search history.

(56) References Cited

U.S. PATENT DOCUMENTS

| | | | |
|---|---|---|---|
| 10,574,980 B1* | 2/2020 | Batiz | G06V 20/46 |
| 2021/0233259 A1 | 7/2021 | Wang et al. | |
| 2022/0191562 A1* | 6/2022 | Mishra | H04N 21/251 |

* cited by examiner

*Primary Examiner* — Samira Monshi
(74) *Attorney, Agent, or Firm* — Young Basile Hanlon & MacFarlane, P.C.

(57) ABSTRACT

Methods and systems for analyzing video quality of programming by content type. A method for analyzing video quality includes receiving, at a service provider system, video containing a source event. The system can sample the video at a least processed sampling point in the service provider system. An event feature set characterizing the source event is determined using the sampled video. The event feature set includes unique features that are same and unique features that are substantially same in videos including future occurrences of the source event. The system assesses the quality of one or more sampled videos taken at other delivery path points in the service provider system. The quality assessed using a source event no reference quality evaluator trained using at least the event feature set. The system outputs a quality metric for each of the one or more sampled videos taken at the other delivery path points.

18 Claims, 5 Drawing Sheets

METHODS AND APPARATUS FOR ANALYZING VIDEO QUALITY OF PROGRAMMING BY CONTENT TYPE

TECHNICAL FIELD

This disclosure relates to quality analysis of video. More specifically, this disclosure relates to real-time no reference or blind quality analysis of content specific video.

BACKGROUND

Video is delivered from a content provider through a service provider system to an end user device. The service provider system can include video transmission or processing systems which may introduce a perceptual video degradation in comparison to the original video provided by the content provider. That is, the video transmission or processing systems may introduce some amount of distortion or artifacts in the video that negatively impacts the user's perception of the video. Video quality assessment (VGA) tools try to objectively measure the quality of the video using mathematical models. Most VGA tools are done offline on completed video transmissions. Previous real-time VGA tools are limited in their ability to analyze video due to overfitting or other issues.

SUMMARY

Disclosed herein are methods and systems for analyzing video quality of programming by content type.

In some embodiments, a method for analyzing video quality includes receiving, at a service provider system, video containing a source event. The service provider system can sample the video at a least processed sampling point in the service provider system. An event feature set characterizing the source event is determined using the sampled video taken at the least processed sampling point. The event feature set includes unique features that are same and unique features that are substantially same in videos including future occurrences of the source event. The service provider system assesses the quality of one or more sampled videos taken at other delivery path points in the service provider system. The quality assessed using a source event no reference quality evaluator trained using at least the event feature set. The service provider system outputs a quality metric for each of the one or more sampled videos taken at the other delivery path points.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
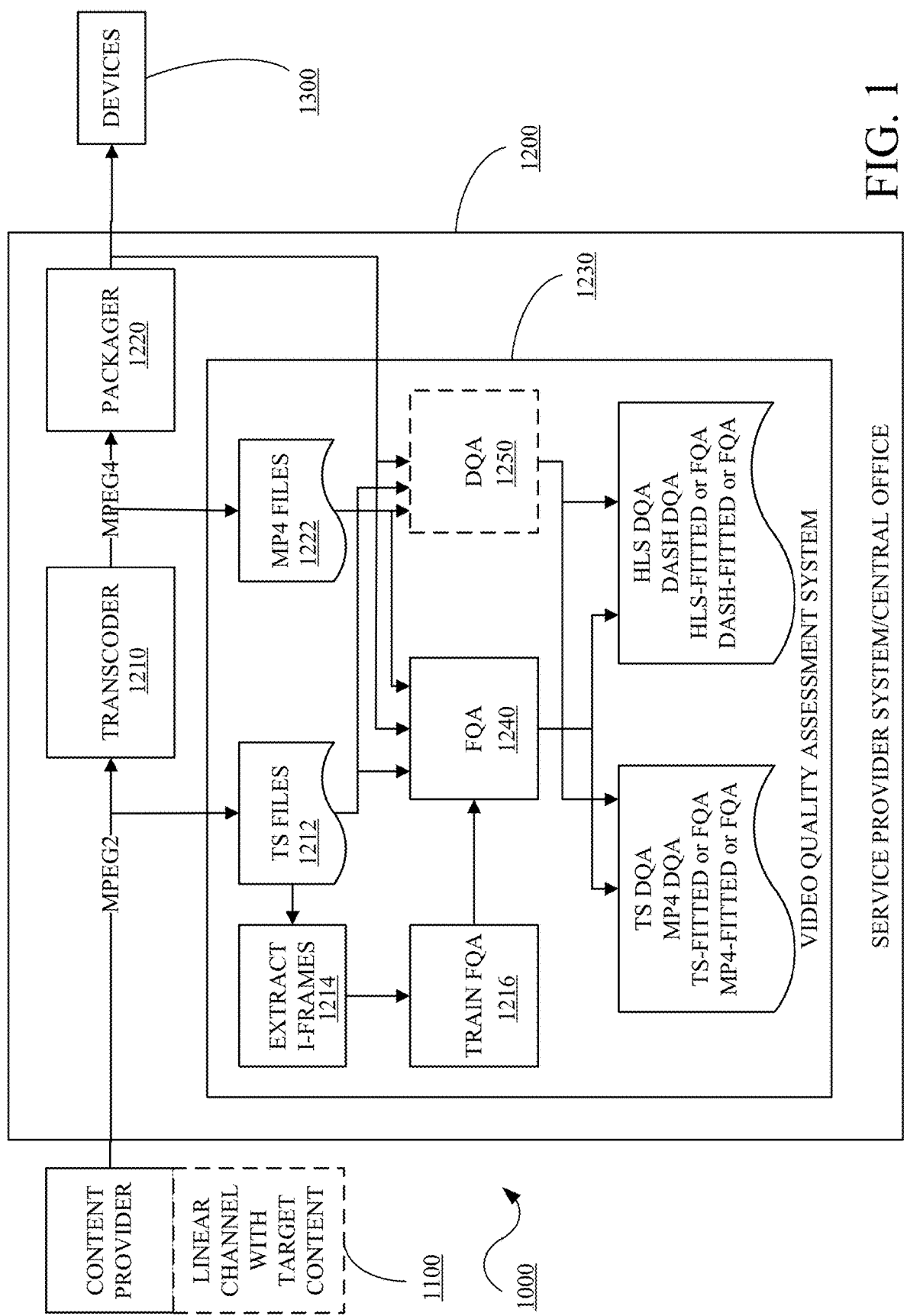
FIG. 1 is a diagram of an example system in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, and the like.

The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices, and systems for analyzing video quality of programming by content type. In some implementations, the programming is linear programming, which refers to watching content from a content provider on its presentation channel at its scheduled time. The programming or content is separated into source events or content types (collectively "source event"), where each source event is associated with or defined by a set of event features or characteristics (collectively "event features") that uniquely identifies or distinguishes the source event from other source events. That is, the event features define a unique feature set for a source event in a video sample which differentiates source events belonging to a same source event type. For example, a source event can be a city one basketball game at a city one basketball court and another source event can be a city two basketball game at a city two basketball court. Both of these source events belong to a same source event type, namely, basketball game. The event features uniquely define each basketball game so that future occurrences of a city one basketball game at the city one basketball court can be uniquely evaluated versus unique evaluation of future occurrences of a city two basketball game at the city two basketball court. The event features can include features that are the same, similar and/or are substantially similar upon a future occurrence or presentation of the source event. In some implementations, these event features can be referred to as statistical features of the source event. The event features are used as a labeled dataset in supervised machine learning to train and generate a source event fitted measurement model. Each is a tightly fit model based on the unique event features. The source event fitted measurement model can be used as a baseline to measure video quality or estimate a user's perception of quality of future or new airings of the source event. The source event fitted measurement model can use no reference or blind image quality analyzers, measurement tools, or quality assessment tools (collectively "measurement tool") which can utilize new or custom defined models in addition to the default model used or offered by the no reference or blind measurement tool. The measurement tool can output a score indicative of the quality of the video. For example, the measurement tool can be Naturalness Image Quality Evaluator (NIQE), Video Intrinsic Integrity and Distortion Evaluation Oracle (VIIDEO), or other like evaluators.

In some implementations, the quality of the video can be measured at different points in a service provider system. The video can be measured from one or more points in the delivery path to ensure that the video stays consistent all the way to the end user device. In some implementations, scores from one or more delivery path points can be provided to feed other delivery metrics for a comprehensive view of the service provider system delivery health.

In some implementations, the methods, devices, and systems for analyzing video quality of programming by content type provide automatic, real-time, individualized and more accurate quality measurement analysis in comparison to the use of generic or default measurements and models. The quality measurement analysis described herein is based on the extensive use of labeled datasets specific to each source event. Each labeled dataset includes one or more features that are the same in each airing of the source event. Moreover, each labeled dataset includes one or more features that are substantially the same in each airing of the source event. This results in finely tuned fitted models for comparison against new airings of the source event. This in turn results in more accurate quality scores. In contrast, default or generic models introduce errors based on fit with the source event.

FIG. 1 is a diagram of an example system 1000 in accordance with embodiments of this disclosure. The system 1000 can include, but is not limited to, one or more content providers 1100, a service provider system 1200, and one or more devices 1300. The service provider system 1200 can include, but is not limited to, transcoder(s) 1210 connected to or in communication with (collectively "connected to")

packager(s) 1220, which outputs video streams that are directed by the service provider system 1200 to the devices 1300. The service provider system 1200 can include a video quality assessment system 1230 which includes a source event fitted quality analyzer or source event fitted quality model (collectively a fitted quality analyzer "FQA") 1240 and may include a default quality analyzer or quality model (collectively a default quality analyzer "DQA") 1250. In some implementations, the content providers 1100, the service provider system 1200 and components thereof, and the one or more devices 1300 are connected to each other via a combination of wired and/or wireless techniques, systems, and/or devices. The system 1000 is illustrative and may include additional, fewer, or different components, entities and the like which may be similarly or differently architected without departing from the scope of the specification and claims herein.

The one or more content providers 1100 can provide programming or content via one or more channels. In some implementations, the programming is linear programming and the channels are linear channels. In this instance, linear refers to programming or content being presented to a user at a content provider's scheduled time on the denoted channel. In some implementations, the programming is on-demand. A programming or content is a separate, particular, or unique source event that is associated with or defined by event features that uniquely identify or distinguish the source event from other source events. For example, a source event can be a news programming, where the event features can include, but are not limited to, the set which can be the same and the personalities and graphics, which can be substantially similar from day to day, (i.e., different clothes and different weather map for example). Different news programming broadcast times, which have different event features, are different source events. That is, all news programming are not treated as one source event. However, occurrences of the news programming at the same time but on different days can use the model based on a same source event. Each news programming having a scheduled time with the same event features is treated as a source event.

In another example, a source event can be a soccer game, where the event features can include, but are not limited to, the field, stadium, and goals, which can be the same for each game, and the home team players, which can be substantially similar for each game.

Figure 2:
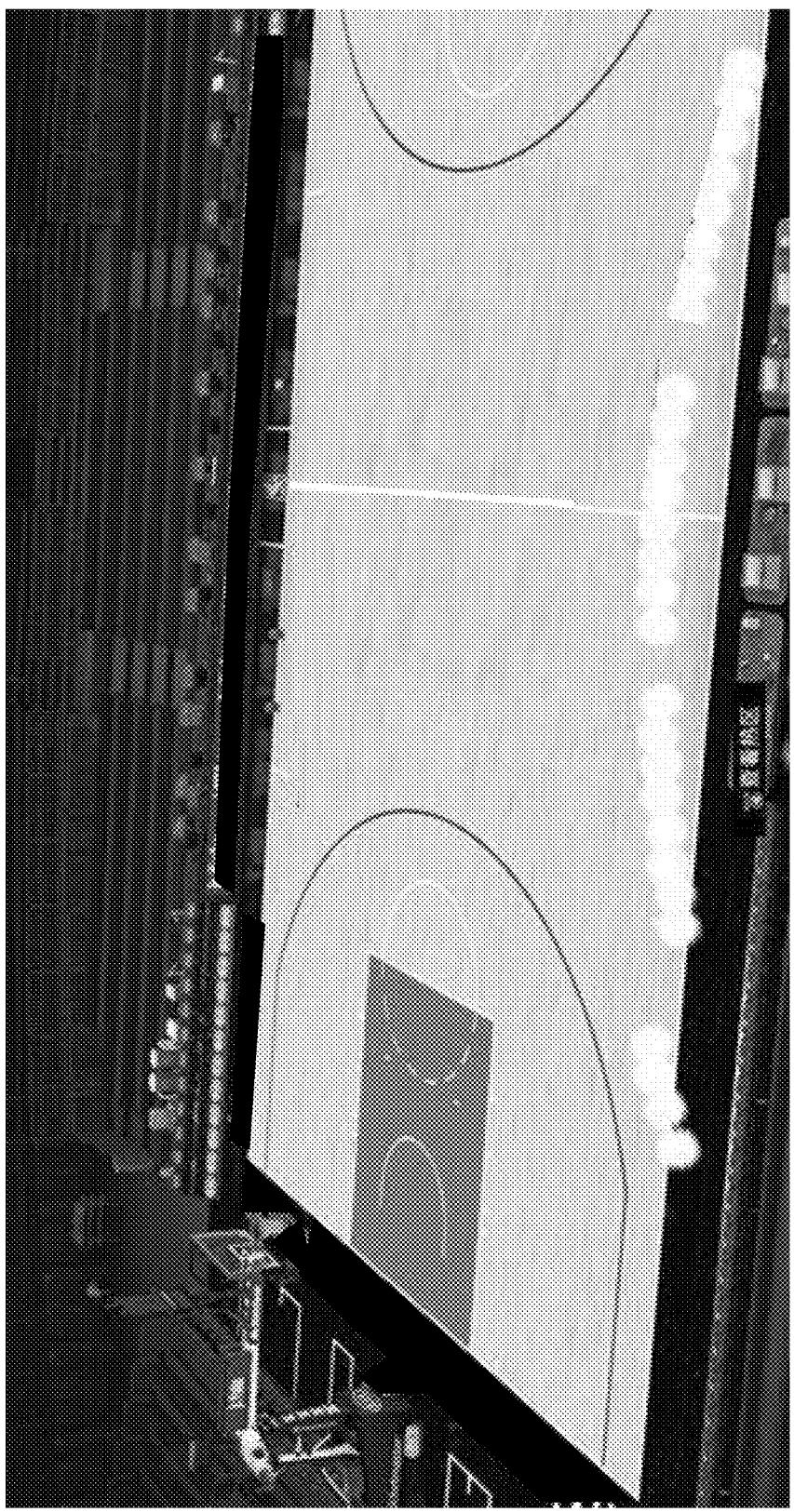
FIG. 2 is a photograph of an example image from a source event in accordance with some embodiments of this disclosure.
Figure 3:
FIG. 3 is a photograph of another example image from another source event in accordance with some embodiments of this disclosure.

In another example, a source event can be a basketball game, where the event features can include, but are not limited to, the court including floor patterns, seating arrangement, logos, and color schemes, which can be the same for each game, and the home team players, which can be substantially similar for each game. FIGS. 2 and 3 show photographs of a first basketball court and a second basketball court. A source event can be defined for programming or content using the FIG. 2 image and another source event can be defined for programming or content using the FIG. 3 image, which each use different event features. By distinguishing them as different event sources, each can source event can be analyzed individually to provide a more accurate quality measurement.

The service provider system 1200 can receive video from the one or more content providers 1100 with the target content. The service provider system 1200 includes a delivery path via the transcoder(s) 1210 and the packager(s) 1220, and a quality assessment path implemented by the video quality assessment system 1230.

The devices 1300 can be, but are not limited, to mobile device(s), laptops, smart television(s), set-top boxes, personal computers (PCs), cellular telephones, Internet Protocol (IP) devices, computers, desktop computers, handheld computers, PDAs, personal media devices, notebooks, notepads, streaming devices, and the like. The devices 1300 can also include components used in the delivery path from the service provider system 1200 to a premises which can contain one or more devices 1300.

In some implementations, the received video is in a video encoding format such as, for example, Moving Picture Experts Group (MPEG)-2. MPEG-2 files can be stored in transport stream (TS) containers as TS files. The transcoder (s) 1210 can transform the received video from a first video encoding format to a second video encoding format. For example, the second video encoding format can be MPEG-4. MPEG-4 files can be stored in MP4 containers as MP4 files.

The video quality assessment system 1230 can include computing platforms, servers, computing devices, processors, and combinations thereof which can execute, implement, function as, be configured as, and/or combinations thereof with respect to the FQA 1240 and DQA 1250, when applicable. The FQA 1240 and DQA 1250 can be models based, generated and/or implemented as or from neural networks trained using machine learning techniques. The FQA 1240 and DQA are blind or no reference video quality assessment based models, where a reference video is not used or available.

The video quality assessment system 1230 can sample the video or video stream (collectively "video") at different points in the delivery path. For example, the video quality assessment system 1230 can sample the video prior to the transcoder 1210 and save as TS files 1212, prior to the packager 1220 and save as MP4 files 1222, and after the packager 1220. In some implementations, additional samples can be taken along the delivery path. The sampling prior to the transcoder 1210 can be a X second clip taken every Y minutes. The sampling prior to the packager 1220 can be a X second clip taken every Y minutes. The sampling after the packager 1220 can be a Z second clip taken every Y minutes. In some implementations, X can be 10, Y can be 5, and Z can be 2.

For a training path in the quality assessment path, the video quality assessment system 1230 can extract i-frames 1214 from the TS files 1212. In some implementations, the TS files 1212 at this sample point represent a least processed video or video stream in the service provider system 1200. Event features can be determined for each source event. The event features can be labeled training data for a source event, which are then used for training a FQA 1216 ("training FQA 1216") to generate the FQA 1240 using machine learning techniques. The training of the training FQA 1216 can be an on-going or continuous process to refine the FQA 1240. In some implementations, the event features can be updated during the on-going or continuous process to refine the FQA 1240.

Once trained, the FQA 1240 can be used to analyze new occurrences or airings of a source event compare and determine the quality of the resulting delivered video. The new occurrences or airings can be sampled on a regular interval and saved as streams or files for analysis as described herein.

For an automatic and/or real-time assessment path of the quality assessment path, a defined number of frames from the TS files 1212 are input to the FQA 1240 to determine a TS-fitted quality metric. In some implementations, a defined interval of the MP4 files form the MP4 files 1222 are input to the FQA 1240 to determine a MP4-fitted quality metric. In some implementations, a defined interval of sampled post-packager video is input to the FQA 1240 to determine a HLS-fitted quality metric and/or a DASH-fitted quality metric. One or more of the quality metrics can be used to configure components in the delivery path such as the transcoder 1210 and the packager 1220.

In some implementations, the defined number of frames from the TS files 1212, the defined interval of the MP4 files form the MP4 files 1222, and/or the defined interval of the sampled post-packager video are input to the DQA 1250 to output a TS-DQA quality metric, a MP4-DQA quality metric, and/or a HLS-DQA quality metric and/or a DASH-DQA quality metric, respectively. These can be used as a baseline to show improved accuracies of the FQA 1240.

Figure 4:
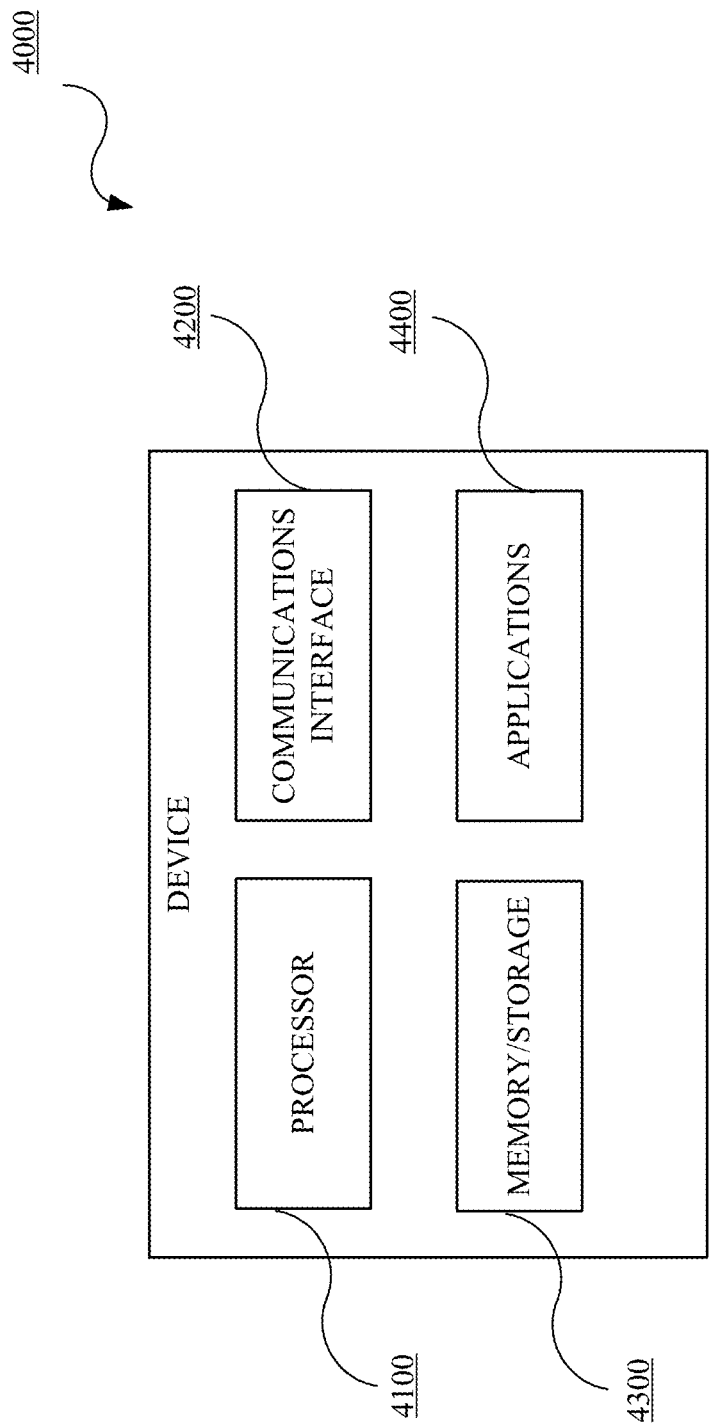
FIG. 4 is a block diagram of an example device in accordance with some embodiments of this disclosure.

FIG. 4 is a block diagram of an example device 4000 in accordance with some embodiments of this disclosure. The device 4000 may include, but is not limited to, a processor 4100, a memory/storage 4200, a communication interface 4300, and applications 4400. The device 4000 may include or implement, for example, the system 1000, the one or more content providers 1100, the service provider system 1200, the devices 1300, the video quality assessment system 1230, the FQA 1240, the DQA 1250, and components therein. In implementations, the memory/storage 4200 may store the content, segments, TS files, MP4 files, quality metric files, models, and the like information. The techniques or methods described herein may be stored in the memory/storage 4200 and executed by the processor 4100 in cooperation with the memory/storage 4200, the communications interface 4300, and applications 4400, as appropriate. The device 4000 may include other elements which may be desirable or necessary to implement the devices, systems, methods described herein. However, because such elements and steps are well known in the art, and because they do not facilitate a better understanding of the disclosed embodiments, a discussion of such elements and steps may not be provided herein.

Figure 5:
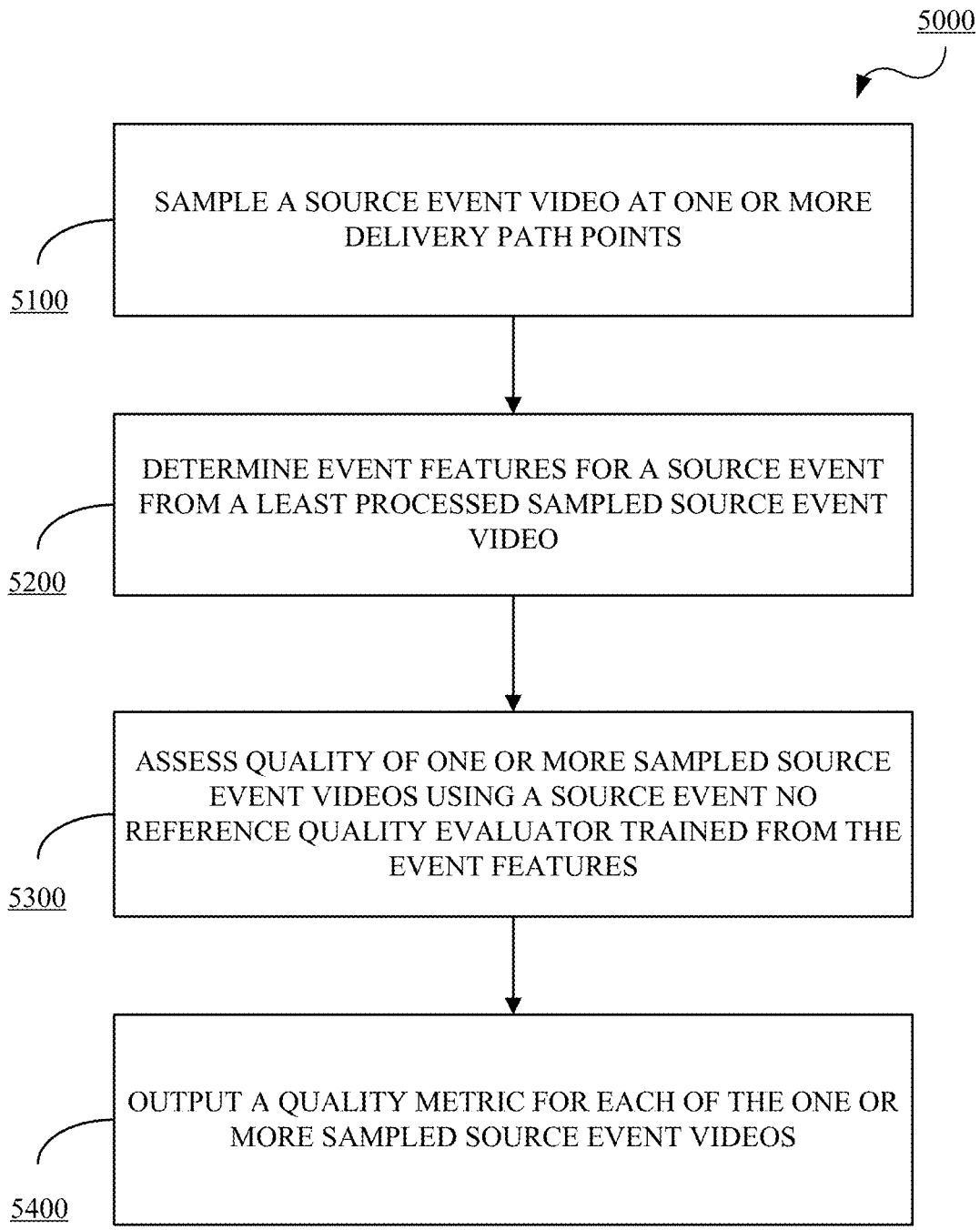
FIG. 5 is a flowchart of an example method for analyzing video quality of programming by content type in accordance with embodiments of this disclosure.

FIG. 5 is a flowchart of an example method 5000 for analyzing video quality of programming by content type in accordance with embodiments of this disclosure. The method 5000 includes: sampling 5100 a source event video at one or more delivery path points; determining 5200 event features for a source event from a least processed sampled source event video taken at a delivery path point; assessing 5300 quality of one or more sampled source event videos taken at other delivery path points using a source event no reference quality evaluator trained with event features from multiple least processed sampled source event videos; and outputting 5400 a quality metric for each of the one or more sampled source event videos taken at the other delivery path points. For example, the method 4000 may be implemented, as applicable and appropriate, by the processor 4100, the memory/storage 4200, the communication interface 4300, the applications 4400, the device 4000, the system 1000, the one or more content providers 1100, the service provider system 1200, the devices 1300, the video quality assessment system 1230, the FQA 1240, the DQA 1250, and components therein, for example.

The method 5000 includes sampling 5100 a source event video at one or more delivery path points. A service provider system receives video containing programming and/or content from content source providers. The video is processed by multiple components in the service provider system including encoders, transcoders, packager, and the like. Each processing step can affect the quality of the video output sent to an end user or a device used by the end user. Automatically tracking the quality of the video as it travels through the service provider system is important for the end user experience. A video quality assessment system can automatically determine and track the quality of the video as it progresses through the service provider system. The video is sampled at multiple delivery path points in the service provider system. The sampling rate or amount of video sampled is defined and can vary depending on the delivery path point.

The method 5000 includes determining 5200 event features for a source event from a least processed sampled source event video taken at a delivery path point. The video quality assessment system uses a quality evaluator model trained using machine learning techniques. The training dataset is a labeled dataset which includes event features descriptive of the sources event. These event features include features that are the same and that are substantially the same. The event features are taken from a least processed video. The training is an on-going process and can happen upon an occurrence of the source event.

The method 5000 includes assessing 5300 quality of one or more sampled source event videos taken at other delivery path points using a source event no reference quality evaluator trained with event features from multiple least processed sampled source event videos outputting 5400 a quality metric for each of the one or more sampled source event videos taken at the other delivery path points. Sampled source event videos are input to the trained model to determine quality metrics or scores. These metrics can be used to reconfigure service provider systems and/or determine a health of the service provider system.

In some implementations, a method for analyzing video quality includes receiving, at service provider system, video containing a source event, sampling, by the service provider system, the video at a least processed sampling point in the service provider system, determining an event feature set characterizing the source event using the sampled video taken at the least processed sampling point, wherein the event feature set includes unique features that are same and unique features that are substantially same in videos including future occurrences of the source event, assessing, by the service provider system, quality of one or more sampled videos taken at other delivery path points in the service provider system, the quality assessed using a source event no reference quality evaluator trained using at least the event feature set, and outputting, by the service provider system, a quality metric for each of the one or more sampled videos taken at the other delivery path points.

In some implementations, the unique features that are the same are consistent in appearance, size, and shape in the future occurrences of the source event. In some implementations, the unique features that are the substantially same are consistent in size and shape and have a change in appearance in the future occurrences of the source event. In some implementations, the event feature set is determined for each occurrence of the source event in future videos to refine the source event no reference quality evaluator. In some implementations, the method further includes training, by the service provider system, the source event no reference quality evaluator using the at least the event feature set. In some implementations, the method further includes sampling, by the service provider system, the video and the videos at different sampling points in the service provider system. In some implementations, different sampling points include at least a pre-transcoder sampling point, a pre-packaging sampling point, and a post-packager sampling point. In some implementations, samples are taken at defined intervals for defined periods of time from the video or the videos.

In some implementations, a video quality assessment system includes a memory and a processor connected to the memory, the processor and the memory implementing a blind quality assessment model. The processor configured to sample an occurrence of a content type from a video stream at a minimum processing point at a service provider, extract a content type characterization set from the sampled content type, the content type characterization set defining unique substantially non-changing aspects of the content type across multiple occurrences, evaluate quality of one or more samples of the content type using the blind quality evaluator trained using at the content type characterization set, the one or more samples obtained at other processing points at the service provider, and send a quality metric for each of the one or more samples to evaluate service provider health.

In some implementations, the content type characterization set includes unique non-changing aspects of the content type across multiple occurrences. In some implementations, the unique non-changing aspects of the content type are consistent in appearance, size, and shape in the future occurrences of the content type. In some implementations, the unique substantially non-changing aspects of the content type are consistent in size and shape and have a change in appearance in the future occurrences of the content type. In some implementations, the processor is further configured to extract content type characterization sets from each sampled content type taken at the minimum processing point from future occurrences of the content type and refine the blind quality evaluator using the content type characterization sets. In some implementations, the processor is further configured to train the blind quality evaluator using the at least the content type characterization set. In some implementations, the processor is further configured to sample at the other processing points for each occurrence of the content type. In some implementations, the other processing points include at least a pre-transcoder sampling point, a pre-packaging sampling point, and a post-packager sampling point. In some implementations, samples are taken at defined intervals for defined periods of time from the video or the videos.

In some implementations, a service provider system includes service provider processing components and a video quality assessment system connected to inputs and outputs of the service provider processing components, The video quality assessment system configured to define a unique feature set for a source event in a video sample taken at an input of a first service provider processing component, wherein the unique feature set differentiates source events belonging to a same source event type, train a no reference quality evaluator using the unique feature set, assess quality of source event in video samples using the trained no reference quality evaluator, the video samples taken at later inputs and outputs of the service provider processing components, and output a quality score for each video sample.

In some implementations, the video quality assessment system further configured to define unique feature sets from future source event occurrences in video samples taken at the input of the first service provider processing component and refine the no reference quality evaluator using the unique feature sets. In some implementations, the service provider processing components includes at least a transcoder and a packager.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for analyzing video quality, the method comprising:
   receiving, at service provider system, video containing a source event;
   sampling, by the service provider system, the video at a sampling point where the video is least processed in the service provider system;
   determining an event feature set characterizing the source event using the sampled video taken at the sampling point, wherein the event feature set includes unique features that are same and unique features that are substantially same in videos including future occurrences of the source event and wherein the unique features that are the same are consistent in appearance, size, and shape in the future occurrences of the source event;
   assessing, by the service provider system, quality of one or more sampled videos taken at other delivery path points in the service provider system, the quality assessed using a source event no reference quality evaluator trained using at least the event feature set; and
   outputting, by the service provider system, a quality metric for each of the one or more sampled videos taken at the other delivery path points.

2. The method of claim 1, wherein the unique features that are the substantially same are consistent in size and shape and have a change in appearance in the future occurrences of the source event.

3. The method of claim 1, wherein the event feature set is determined for each occurrence of the source event in future videos to refine the source event no reference quality evaluator.

4. The method of claim 1, the method further comprises:
   training, by the service provider system, the source event no reference quality evaluator using the at least the event feature set.

5. The method of claim 1, the method further comprises:
   sampling, by the service provider system, the video and the videos at different sampling points in the service provider system.

6. The method of claim 5, wherein the different sampling points include at least a pre-transcoder sampling point, a pre-packaging sampling point, and a post-packager sampling point.

7. The method of claim 6, wherein samples are taken at defined intervals for defined periods of time from the video or the videos.

8. A video quality assessment system comprising:
   a memory; and
   a processor connected to the memory, the processor and the memory implementing a blind quality assessment model, the processor configured to:
      sample an occurrence of a content type from a video stream at a minimum processing point at a service provider system;
      extract a content type characterization set from the sampled content type, the content type characterization set defining unique substantially non-changing aspects of the content type across multiple occurrences and unique non-changing aspects of the content type across multiple occurrences;
      evaluate quality of one or more samples of the content type using the blind quality evaluator trained using at the content type characterization set, the one or more samples obtained at other processing points at the service provider system; and
      send a quality metric for each of the one or more samples to evaluate service provider system health.

9. The system of claim 8, wherein the unique non-changing aspects of the content type are consistent in appearance, size, and shape in the future occurrences of the content type.

10. The system of claim 8, wherein the unique substantially non-changing aspects of the content type are consistent in size and shape and have a change in appearance in the future occurrences of the content type.

11. The system of claim 8, wherein the processor is further configured to:
    extract content type characterization sets from each sampled content type taken at the minimum processing point from future occurrences of the content type; and refine the blind quality evaluator using the content type characterization sets.

12. The system of claim 8, wherein the processor is further configured to:
   train the blind quality evaluator using the at least the content type characterization set.

13. The system of claim 8, wherein the processor is further configured to:
   sample at the other processing points for each occurrence of the content type.

14. The system of claim 13, wherein the other processing points include at least a pre-transcoder sampling point, a pre-packaging sampling point, and a post-packager sampling point.

15. The system of claim 14, wherein samples are taken at defined intervals for defined periods of time from the video or the videos.

16. A service provider system comprising:
   service provider processing components;
   a video quality assessment system connected to inputs and outputs of the service provider processing components, the video quality assessment system configured to:
      define a unique feature set for a source event in a video sample taken at an input of a first service provider processing component, wherein the unique feature set differentiates source events belonging to a same source event type;
      train a no reference quality evaluator using the unique feature set, wherein the trained no reference quality evaluator includes refinement using unique feature sets from future source event occurrences in video samples taken at the input of the first service provider processing component;
      assess quality of source event in video samples using the trained no reference quality evaluator, the video samples taken at later inputs and outputs of the service provider processing components; and
      output a quality score for each video sample.

17. The system of claim 16, the video quality assessment system further configured to:
   define the unique feature sets from the future source event occurrences in the video samples taken at the input of the first service provider processing component and
   refine the no reference quality evaluator using the unique feature sets.

18. The system of claim 16, wherein the service provider processing components includes at least a transcoder and a packager.

* * * * *